United States Patent [19]

Lau

[11] 3,791,809

[45] Feb. 12, 1974

[54] METHOD OF STRENGTHENING GLASS ARTICLES USING POWDERED SALTS FOR ION EXCHANGE

[75] Inventor: Raymond Thomas Lau, Toledo, Ohio

[73] Assignee: Owens-Illinois, Inc., Toledo, Ohio

[22] Filed: Jan. 12, 1973

[21] Appl. No.: 323,172

[52] U.S. Cl............................ 65/30, 65/60, 117/21, 117/123 B
[51] Int. Cl...................... C03c 17/00, C03c 21/00
[58] Field of Search... 65/30, 60; 117/123 B, 100 B, 117/107.2 R, 21

[56] References Cited
UNITED STATES PATENTS

| 3,287,201 | 11/1966 | Chisholm et al.................. 65/30 X |
| 3,622,374 | 11/1971 | Pike............................. 117/107.2 P |
| 3,741,780 | 6/1973 | Hoffman et al............. 117/123 B X |
| 3,532,530 | 10/1970 | Denison et al........................ 117/21 |
| 3,676,097 | 7/1972 | Plumat et al........................ 65/30 X |

*Primary Examiner*—Arthur D. Kellogg
*Assistant Examiner*—Kenneth M. Sehor
*Attorney, Agent, or Firm*—Richard D. Heberling; E. J. Holler

[57] ABSTRACT

Methods for strengthening glass articles such as glass containers are disclosed using powdered salts as the ion exchange medium. In one embodiment, beer bottles made of a conventional flint container glass are sprayed with a powdered ion exchange medium comprising potassium nitrate and tripotassium phosphate. The hot, newly-formed bottles can be advantageously run through the normal annealing treatment in a large volume production line to provide strengthened bottles.

25 Claims, No Drawings

METHOD OF STRENGTHENING GLASS ARTICLES USING POWDERED SALTS FOR ION EXCHANGE

BACKGROUND OF THE INVENTION

This invention is directed to methods for strengthening glass articles by ion exchange treatment. More particularly, the present invention is directed to strengthening glass containers, such as beer bottles, using a convenient and efficient powdered ion exchange medium.

In the manufacture of glass articles, and particularly in the manufacture of glass containers, such as beer bottles in high-speed production lines, it is desirable to strengthen the containers without hindering the production capacity of the container plant.

It is an object of the present invention to provide methods of strengthening glass articles, such as glass containers, using a convenient and efficient ion exchange medium.

It is an object of the present invention to provide an improvement in the method of strengthening glass containers, and particularly silicate glass bottles, using the ion exchange process in which alkali metal ions in the surface layer of the glass are replaced by different alkali metals from an external source, the improvement being the utilization of a convenient and efficient powdered ion exchange medium that can be easily adapted to a high-speed commercial production line.

It is an object of the present invention to provide a method of strengthening silicate glass articles by spraying the powdered mixture of potassium nitrate and tripotassium phosphate onto the surface of the article immediately after forming the same, and thereafter heating the article at an elevated temperature sufficient for an ion exchange reaction.

It is an object of the present invention to provide an article formed of silicate glass having at least one glass surface containing thereon a deposited layer of an admixture of powdered alkali metal salt in which at least one of the salts contains an alkali metal ion different from the alkali metal ion in the silicate glass.

It is an object of the present invention to provide an improvement in the method of strengthening a silicate glass container made on high-speed production lines using an ion exchange reaction on the surface of the glass container, the improvement including spraying the surface of the glass container with a powdered mixture of an alkali metal ion different from the alkali metal ion in the glass, in which mixture one of said salts has a melting point such that it will melt on contact with the glass at the temperatures employed in the ion exchange reaction, maintaining the glass container at an elevated temperature sufficiently high and for a period of time to provide a compressive stress surface layer in the glass article, but for a time insufficient to provide ion exchange to any substantial degree in the interior portion of the glass container, and also for a time insufficient to allow for any substantial stress relaxation of the glass in the surface layer, thereafter cooling the glass container to a temperature at which the ion exchange no longer occurs, and finally removing the salt mixture to thereby produce a strengthened glass container in a high-speed production process.

It is an object of the present invention to provide methods of strengthening silicate glass containers in which the glass composition includes at least about 2% by weight of soda by depositing on the outer container surface a mixture of alkali metal salts that is preferably $KNO_3$ and a phosphate salt of potassium such as $K_3PO_4$ or $K_2HPO_4$ one of the alkali metal salts being fusible first at a relatively low melting point and the other alkali metal salt adhering to the fused layer formed by the first salt, and thereafter heating the glass article with the mixture of powdered salt on the surface layer at an elevated temperature which is at least about 200° C. and less than about 50° C. above the annealing point of the glass for a time period from about 5 minutes to about 24 hours.

These and other objects will become apparent from the description that follows and the appended claims.

The present invention provides an outstanding improvement in the production of strengthened silicate glass articles, and particularly glass containers such as bottles in which an ion exchange reaction is utilized to strengthen an outer surface layer of the glass by replacing alkali metal ions in the surface layer by different alkali metals from a very convenient and efficient external source of these different ions. The outstanding improvement includes depositing, preferably by spraying, the surface of the glass container with a powdered mixture of alkali metal salts containing alkali metal ions different from the alkali metal ions in the glass, the salts further being charactertized by one of the salts having a melting point so that it will melt on contact with the glass at the temperature of the ion exchange reaction, maintaining the glass container at an ion exchange reaction temperature that is sufficiently high and for a period of time to provide a compressive stress layer in the glass container, but for a time insufficient to provide ion exchange to a substantial degree in the interior portion of the glass and also for a time insufficient to provide substantial stress relaxation of the glass in the surface layer to thereby provide a strengthened container that can be easily made in a high-speed production operation.

The process of chemically strengthening glass by ion exchange, in general, is well-known in the art. The literature and patents disclosing ion exchange techniques, including the replacement of an alkali metal ion such as sodium in the surface layer of the glass, with a larger alkali metal ion, such as potassium, to thereby stuff the surface layer with the larger ion and provide a compressive stress, can be found in a paper by S. S. Kistler, in the *Journal of the American Ceramics Society*, Vol. 45, No. 2, pages 59–68 and U. S. Pat. No. 3,218,220 to Weber. The strengthening of bottles made from container glass suitable for use on a large volume production line, by means of an aqueous solution of a potassium salt which is sprayed on the surface of the container and thereafter the container is heated to ion exchange and strengthen the same, is disclosed in U. S. Pat. No. 3,498,773, to Grubb and LaDue. This patent, along with the aforementioned Weber patent and Kistler publication, are hereby incorporated by reference.

In the present invention, methods of strengthening glass containers are provided in which a very convenient and effective powdered mixture of alkali metal salts is applied by suitable means such as spraying, dusting or dipping to strengthen the containers in a high-speed, large-volume line.

The glass articles that can be strengthened in accordance with the present invention, includes compositions containing at least about 2%, and preferably at least about 5% by weight of an alkali metal, to be at least partially replaced (expressed as soda mole equivalents). The compositions that are preferred for glass containers made on high-speed production lines are soda lime silicate glasses or other readily-handled glass compositions, such as are disclosed in the previously mentioned Grubb and LaDue patent. U.S. Pat. No. 3,524,738 (Grubb, Hagedorn and Monks) discloses easily formed, readily ion exchangeable dolomite-feldspar glass compositions and this patent is incorporated by reference.

As is well-known in the art, many types of silicate glasses, including soda lime silicates, alkali metal silicates and alkali metal alumino silicates — all containing alkali metal ions — have been contacted at elevated temperatures with an alkali metal inorganic salt to exchange the alkali metal ions in one or more surface portions of the glass with alkali metal ions of the salt. Conventionally, the glass article is immersed in a molten bath of the alkali metal salt, such as $KNO_3$. The depth of ion exchange usually depends upon the time of exposure of the glass article in the ion exchange medium, which is the molten salt. There has been some difficulty in commercially developing ion exchange processes, because it is somewhat impractical to immerse a glass article for substantial time periods in a molten salt bath — particularly in a high speed production operation. As previously indicated, the alkali salts have been applied as an aqueous solution by spraying onto the glass article, but this technique may result in damage due to thermal shock, particularly when the glass articles such as containers are newly formed.

In the present invention, the mixture of powdered alkali metal salts is easily applied to the surface of glass articles with a minimum risk of damage previously due to prolonged immersion in a molten salt bath or the thermal shock caused by an aqueous spray solution. Advantageously, the present invention fits very well into the process steps of a high-volume commercial production plant, and particularly in plants making glass containers such as beverage bottles and food jars.

From the safety standpoint, the use of a mixture of dry powdered salt is less hazardous than the use of the liquid spray techniques previously mentioned or the molten salt baths, which can be very dangerous, particularly if some organic material, such as a worker's lunch bag, is inadvertently dropped into the molten bath. The present technique of using a mixture of powdered salts appears to be much safer for the health and safety of the worker himself.

The mixture of dry powdered salts is much easier to handle than the previous techniques employed, and there is less danger over-spraying or cooling the surface of the glass as it is deposited thereon.

One outstanding feature of the present invention is in providing an ion exchange medium in which one of the salts is of a relatively low melting point as compared to the other or others, whereby the first salt melts and fuses, thereby adhering the mixture to the surface of the glass. The first salt acts as a binder and an adhering agent for the other alkali metal salt or salts in the mixture. Hence, in one outstanding embodiment of the present invention, a powdered mixture of $KNO_3$ and another potassium salt that is preferably $K_2HPO_4$, acts as an excellent ion exchange medium, the $KNO_3$ melting first and acting as a relatively low temperature binder for the $K_2HPO_4$. The preferred mixture of powdered salts is one containing about 25 to 50 parts by weight of $KNO_3$ and about 45 to 90 parts by weight of $K_2HPO_4$. A lubricious filler that is preferably cornstarch is used to facilitate the even application of the powdered mixture and is preferably present in amounts of about 1 to 3 and optimally, 2 parts per weight. This cornstarch filler apparently acts as an anti-caking agent that burns off cleanly at the elevated temperature of the ion exchange.

Normally, the low melting salt such as $KNO_3$ should be present in at least about 25% by weight of the easily-sprayed powdered mixture, lower amounts such as 15% and 10% by weight of the $KNO_3$ failing to produce good results.

The overall process of the present invention includes spraying or otherwise applying on at least one area of a surface of a glass article a powdered mixture of alkali metal salts in which at least one of the salts has an alkali metal which is different from the alkali metal of the glass surface to form preferably a substantially continuous layer of the ion exchange medium on the surface of the glass; maintaining the layer of the medium and surface layer of the glass at an elevated temperature for a period of time sufficient for at least some of the alkali metal ions of the glass surface to exchange with the different alkali metal ions thereby, to provide compressive stress in the surface layer of the glass; and cooling the glass surface to a temperature at which the ion exchange no longer occurs. Thereafter, the layer of ion exchange medium is easily removable from the glass by a suitable treatment such as, for example, washing the article with dilute nitric acid or water.

In accordance with a preferred embodiment of this invention, the alkali metal salts of the mixture comprise at least about 90% by weight of the layer of powdered material formed on the glass surface. Fillers are sometimes advantageously employed to render the application of the salts compatible with high-speed production. For instance, a filler such as cornstarch, or colloidal silica in an amount of preferably about ½ or 1 up to 4% by weight and optimally about 2% by weight, is used to enhance the flowability of the powdered mixture and aid in spraying or otherwise applying the mixture to the glass surface.

Further describing the mixture of powdered salts, generally, the low-melting salt comprises about 25 to 50 and preferably 30 to 45 parts by weight of the mixture, and the high-melting salt, that is preferably $K_3PO_4$ or $K_2HPO_4$, is used generally in an amount of about 50 to 90 parts and preferably about 55 to 85 parts by weight.

The elevated temperature that is maintained in the process of the present invention for the ion exchange is a maximum of about 50° C. (approximately 100° F.) above the annealing point of the glass being treated. The preferred elevated temperature for bottle glass is about 800° to 950° F., and generally, in a range of about 700° F. to 1,025° F., provides excellent results. In general, the elevated temperature for the ion exchange is maintained normally at a temperature of at least 200° C. and preferably at a temperature at or above the strain point of the glass being treated, as set forth in the incorporated Grubb and LaDue patent.

The time period for conducting the ion exchange at the elevated temperature is generally dependent on various factors, such as the glass composition, the particular powdered ion exchange mixture, the elevated temperature used, the depth desired for the compressive stress layer, and whether or not the powdered mixture of salt is liable to etch the glass surface and, if so, whether such etch is desired or undesired.

When the temperature is below the strain point of the glass being treated, the time is between about ½ hour to about 24 hours, with the time also varying inversely with temperature. Usually time periods ranging from about 5 minutes to about 4 hours are employed.

According to the process of this invention, the layer of ion exchange medium is formed on the surface of the glass article by spraying, dusting or other suitable means such as a fluidized-bed technique, including dipping and immersing to provide a powdered alkali metal salt layer thereon. The ion exchange medium is generally a mixture of alkali metal salts wherein at least one of the alkali metals is different from the alkali metal ions in the glass. For example, this layer can be formed by spraying the surface area of the glass article with a powdered admixture $K_3PO_4$-$KNO_3$ or $K_2HPO_4$-$KNO_3$. Other combinations of alkali metal salts may also be used provided that at least one salt is present containing a different alkali metal ion relative to the alkali metal ion of the glass and provided at least one of the salts has a relatively low melting point so that it will melt and wet the hot glass surface when sprayed thereon. Some alkali metal salts tend to absorb atmospheric moisture and in these cases, the salts are heated to reduce this water content. Heating the salts for 2 hours in an oven at 120°–130° C. is satisfactory to drive off absorbed water. The dried salts may be ground to powder form more easily and will have better flowability in a dry air stream than salts having absorbed moisture.

The lubricious filler can be a low temperature organic or inorganic anti-caking material that improves the flowability of the alkali metal salt powder and yet preferably will volatilize, with or without decomposition, or burn off at a temperature below or at the temperature maintained for the ion exchange step of the process without adversely affecting the adherence of the alkali metal salt to the surface of the glass article so that the alkali metal salt will form a substantially continuous layer of solid material on the sprayed area of the glass surface. Cornstarch is an example of a suitable material.

Flocculent silica (Cab-O-Sil) may also be used as the anti-caking agent but generally it does not volatilize and is not as easily removed as cornstarch.

In the process of the present invention, some alkali metal salts, used heretofore, such as potassium nitrate ($KNO_3$) and sodium nitrate ($NaNO_3$), may be admixed with other salts of the same alkali metal or another alkali metal to provide the powdered ion-exchange medium, provided that at least one of the salts contains an alkali metal ion different from the alkali metal ion in the glass. Salts such as $KNO_3$, $NaNO_3$, KCl, KBr, KI, $K_2CO_3$ and $KHCO_3$ have melting points such that they melt when contacting the hot glass surface, depending, of course, on the temperature used. $K_2CO_3$ generally develops some haze on the glass surface that may be undesirable for some applications, and $K_2C_2H_2O_2$ generally chars and is difficult to use. They are used in the present invention with salts of alkali metal that have relatively higher melting temperatures such as $K_3PO_4$, $K_2HPO_4$ and $K_2SO_4$. For example, in the replacement of at least part of sodium ions in the surface layer of glass with potassium ions by using potassium salt or salts, the present invention may use a mixture of potassium nitrate and another potassium salt such as potassium carbonate (m.p. of 891° C.), potassium chloride (m.p. of 790° C.), potassium sulfate (m.p. of 1,069° C.), potassium bromide (m.p. of 730° C.), potassium iodide (m.p. of 723° C.), potassium tribasic phosphate (m.p. of 1,340° C.) and potassium metaphosphate (m.p. of 807° C.). The potassium nitrate is a relatively low melting salt (333° C.) and melts upon contact with the hot glass. The other component of the ion exchange mixture may be a salt of potassium that has a melting point above the annealing point of most of the glasses that are ion exchanged by the present process. When using a sodium salt to replace another alkali metal ion, e.g., lithium in the glass by the present process, suitable salts are sodium carbonate (m.p. of 851° C.), sodium chloride (m.p. of 800° C.), sodium bromide (m.p. of 755° C.), sodium iodide (m.p. of 651° C.), sodium sulfate (m.p. of 884° C.), sodium pyrophosphate (m.p. of 988° C.) and sodium metaphosphate (m.p. of 628° C.). The low melting sodium nitrate ($NaNO_3$) may be used in the same manner as the $KNO_3$, i.e., it melts upon contact with the hot glass. The comparable salts of rubidium and cesium can be used, with their suitable high melting points, to replace other alkali metals or each other.

In another, more specific, embodiment of the present invention, the admixture is powdered $KNO_3$ and $K_2HPO_4$, or preferably a mixture of $KNO_3$ and $K_3PO_4$ which is sprayed on the glass article immediately after forming the article to form the coating layer and the elevated temperature necessary for the ion exchange reaction is provided by the normal annealing heat treatment. This reaction step can be easily blended into the normal high-speed production process.

The terms "annealing point" and "annealing temperature," as used herein, mean the same thing. As defined in standard text books, the annealing point is the temperature at which the internal strains in glass are reduced to an acceptable limit in 15 minutes and where the glass has a viscosity of $10^{13}$ poises. It is determined by a test (ASTM Design. C336-54T) which is made with a weighted glass fiber in a furnace cooled at a rate of 4° C. per minute. The annealing-point temperature is determined from rates of elongation of the fiber. The strain point is the temperature at which the internal stresses are reduced to low values in 4 hours. At this viscosity, which is $10^{14.5}$ poises, the glass is substantially rigid. The data for determining the strain point are obtained by using the same procedure that is used for the annealing point, but for a slower rate of fiber elongation.

The following examples illustrate the present invention using various alkali metal salts.

EXAMPLE I

One-way beer bottles, that were made of a conventional flint container glass and are referred to by assignee as GB-2000 and GB-121 bottles, are sprayed with the powdered ion exchange medium immediately after the formation of these bottles and thus prior to their annealing. The bottles at the place of spraying would be at temperatures between about 750° F. and about 1,150° F., as previously determined. The temperature of bottles at the spraying locations varied in the temperature study because they are from different molds of an IS machine and are different in style.

Admixtures of the following salts were prepared by ball mill grinding:

| | | |
|---|---|---|
| A) $KNO_3$ | 35% | 159 grams |
| $K_3PO_4$ | 63% | 286 grams |
| Cornstarch | 2% | 9 grams |
| B) $KNO_3$ | 30% | 136 grams |
| $K_3PO_4$ | 68% | 309 grams |
| Cornstarch | 2% | 9 grams |
| C) $KNO_3$ | 25% | 114 grams |
| $K_3PO_4$ | 73% | 332 grams |
| Cornstarch | 2% | 9 grams |
| D) $KNO_3$ | 15% | 68 grams |
| $K_3PO_4$ | 83% | 377 grams |
| Cornstarch | 2% | 9 grams |
| E) $KNO_3$ | 43% | 193.5 grams |
| $K_3PO_4$ | 55% | 297.5 grams |
| Cornstarch | 2% | 9 grams |

Ten bottles are sprayed on their outside surface with each of the above powders. A conventional powder spray or flocking gun may be used for this purpose, operating at 15 psi, for example. The hot, newly-formed bottles after being sprayed with these powdered salts are immediately run through the annealing lehr to receive the normal annealing-temperature treatment that unsprayed bottles receive in their manufacture.

A temperature profile in a normal annealing lehr has been determined using a traveling thermocouple attached to the bottom of a bottle. This temperature profile determination indicates that for about the last one-half of the initial 5 minutes, the temperature of the bottom of bottle was rising from about 980° F. and then in the next 5 minutes, the bottom of the bottle was at a temperature between 1,000° F. and 1,025° F. After the first 10 minutes, the temperature decreases. At the end of about 15 minutes overall, the temperature was reduced to 900° F. and at the end of 20 minutes overall, it was reduced to about 600° F. followed by still further cooling. The total travel time through the lehr is about 40 minutes.

The glass of these bottles has an annealing point of 1033° F. and a strain point of 986° F. This glass has the following theoretical composition, expressed as oxides in weight percent:

| | |
|---|---|
| $SiO_2$ | 72.0 |
| $Al_2O_3$ | 1.9 |
| CaO | 9.6 |
| MgO | 4.2 |
| $Na_2O$ | 11.5 |
| $K_2O$ | 0.4 |

This is a conventional soda-lime-silica container glass. Its manufacture is described in many places in the literature such as "Handbook of Glass Manufacture" by Tooley, published in 1953. A typical batch composition for this glass is as follows on a weight percent basis:

| | |
|---|---|
| Sand | 57.1 |
| Soda Ash | 15.8 |
| High Calcite Lime | 5.9 |
| Raw Dolomite | 14.6 |
| Nepheline Syenite | 6.1 |
| Salt Cake | 0.5 |

The bottles, after exiting from the annealing lehr and cooling to room temperature, are washed with water.

The sprayed bottles are collected and thin sections prepared for testing. The results are shown below:

| Sample | Depth in Microns (Average) | Stress, psi (Average) |
|---|---|---|
| A | 11.0 | 12,000 |
| B | 8.8 | 11,000 |
| C | 10.0 | 11,900 |
| D | 6.3 | 1,600 |
| E | 12.7 | 13,600 |

Based on the results obtained, it was concluded that best results are obtained when the mixture of potassium salts contain at least 25% $KNO_3$. Also, powdered $KNO_3$ was tried as the sole alkali metal salt. It was found that 100% $KNO_3$ does not work, it providing very low stress.

EXAMPLE II

One-way beer bottles, having the glass composition described above in Example I, are used in this example. Twelve bottles are treated as shown in the following table, with each test covering two bottles. Two (2) percent cornstarch was present in the powdered mixture.

| Test | Spray Time | % $KNO_3$ | % $K_3PO_4$ | % $K_2HPO_4$ |
|---|---|---|---|---|
| 1 | 5 sec. | 43 | 55 | |
| 2 | 10 sec. | 43 | 55 | |
| 3 | 5 sec. | 43 | | 55 |
| 4 | 10 sec. | 43 | | 55 |
| 5 | 5 sec. | 33 | | 65 |
| 6 | 10 sec. | 33 | | 65 |

Thin sections were taken of all bottles and the depth and stress was measured in each case. Subscripts 1 and 2 represent points on the container samples that were 180° apart from each other:

| | Stress-psi $M_1/M_2$ | Depth-microns $D_1/D_2$ |
|---|---|---|
| 1 | 22,220/15,500 | 8.8/4.4 |
| 2 | 27,500/22,200 | 8.1/6.3 |
| 3 | 9,900/8,000 | 7.5/7.5 |
| 4 | 19,100/21,100 | 8.8/10.0 |
| 5 | 16,700/15,600 | 6.3/8.0 |
| 6 | 7,900/18,900 | 8.8/10.0 |

In general, the powdered layer applied to the glass surface has a thickness of about 2 mils to 40 mils or more and preferably 10 to 20 mils, the spraying time in a high speed production process being about 4 to 5 up to 6 or 7 seconds, there being about generally 40 to 80 seconds and preferably 55 to 60 seconds time elapsed after the blow mold opened and the newly-formed bottle transported to the spraying machine located just before the annealing lehr. The bottle temperature is generally around 925° or 950° up to 1,000° or 1,025° F. as the bottle is delivered to the spraying machine operation. In general, in the above process, the annealing lehr temperatures are about 850° to 1000° F.

Modifications of the present invention will be apparent to one of ordinary skill in the art. Thus, the foregoing description has been presented for purpose of illustration and not for the purpose of limiting the invention which is limited only by the claims that follow.

I claim:

1. In the method of strengthening a silicate glass article, at elevated temperatures, wherein alkali metal ions in the surface layer of the glass are replaced by different alkali metal ions from an external source, the improvement comprising, spraying said surface of said glass article with a powdered admixture of alkali metal ion different from the alkali metal in the glass and wherein one of said salts has a melting point such that it will melt on contact with the glass of the temperature of the ion exchange, maintaining the glass article at an elevated temperature sufficiently high and for a period of time to provide a compressive stress surface layer in the glass article, but for a time insufficient to provide ion exchange to a substantial degree in the interior portion of the glass of the article and for a time insufficient to provide substantial stress relaxation of said glass in said surface layer, cooling the glass article to a temperature at which the ion exchange does not occur, removing the alkali metal salt and thereby producing a strengthened glass article.

2. The method of claim 1, wherein the glass composition includes at least 2% by weight of soda ($Na_2O$) and wherein the admixture of alkali metal salts contains at least one potassium salt.

3. The method of claim 2 wherein the potassium salt layer is removed by washing the glass article with water.

4. The method of claim 1 wherein the alkali metal salt admixture comprises $K_3PO_4$ and $KNO_3$.

5. The method of claim 1 wherein the alkali metal salt admixture comprises $KNO_3$ and $K_2HPO_4$.

6. The method of claim 1 wherein said elevated temperature is at least about 200° C. and less than about 50° C. above the annealing point of the glass being treated for a time period ranging from about 5 minutes to about 24 hours.

7. The method of claim 1 wherein the glass composition contains at least about 5% by weight of soda.

8. The method of claim 1 wherein said powdered admixture contains an organic material which assists the flowability of the coating.

9. The method of claim 1 wherein said coating layer is formed on the glass article by spraying the powdered admixture onto said article immediately after forming said article, and the elevated temperature necessary for the ion exchange reaction is provided by the subsequent annealing heat treatment of the glass article.

10. The method of claim 1 wherein said glass is a soda-lime-silica glass.

11. The method of claim 1 wherein said glass is an aluminosilicate glass.

12. A strengthened silicate glass article made by the method of claim 1.

13. In a process of making bottles of container glass, containing sodium ions, expressed as sodium oxide, by forming a bottle from a quantity of molten glass at a forming station, transferring the newly-formed bottle to an annealing station at a temperature at or above the strain point of the glass but below the softening point, moving the bottles through the annealing station to remove stresses created in the glass by the bottle-forming operation, and cooling the bottle from the annealing station to a moderate elevated temperature that is substantially below the strain point of the glass, the improvement which comprises:

1. applying to the outer surface of the newly-formed bottle, before its movement through the annealing station, a mixture of powdered alkali metal salts to thereby provide a layer of powdered material on the outer surface, and 2. heating the layer of powdered material as the bottle passes through the annealing station to provide a strengthened bottle by ion exchange of alkali metal ions in the layer of partially fused, powdered material for the sodium ions in the surface layer of the glass bottle to provide a compressive stress layer on the bottle and strengthen the same.

14. A process as defined in claim 13 in which the glass is a flint container glass.

15. A process as defined in claim 13 in which the mixture of powdered alkali metal salts comprises a first alkali salt of relatively low melting point and a second alkali metal salt having a melting point higher than that of the first salt whereby the second salt adheres to the fused layer formed by the first layer.

16. A process as defined in claim 15 in which the mixture of alkali metal salts comprises $KNO_3$ and $K_2HPO_4$.

17. A process as defined in claim 15 in which the mixture of alkali metal salts comprises $KNO_3$ and $K_3PO_4$.

18. A strengthed bottle made by the process of claim 13.

19. A process as defined in claim 13 in which the glass composition comprises at least about 5% by weight of soda.

20. A process as defined in claim 13 in which the glass composition comprises:

| Ingredient | Parts By Weight |
|---|---|
| $SiO_2$ | 72 |
| $Al_2O_3$ | 1.9 |
| CaO | 9.6 |
| MgO | 4.2 |
| $Na_2O$ | 11.5 |
| $K_2O$ | 0.4 |

21. A process as defined in claim 13 in which the mixture of alkali metal salts contains at least about 25% by weight of $KNO_3$.

22. A process as defined in claim 13 in which the mixture of alkali metal salts contains about 25 to 50 parts by weight of $KNO_3$ and about 50 to 90 parts by weight of $K_2HPO_4$.

23. A process as defined in claim 13 in which the mixture of alkali metal salts comprises about 25 to 50 parts by weight of $KNO_3$, and about 50–90 parts by weight of $K_3PO_4$ and about ½ to 10 parts by weight of a lubricious filler.

24. A process as defined in claim 13 in which the mixture of alkali metal salts includes about 43 parts by weight of $KNO_3$, about 55 parts by weight of $K_3PO_4$ and about 2 parts by weight of cornstarch.

25. A process as defined in claim 13 in which the mixture of alkali metal salts comprises about 30 to 45 parts by weight of $KNO_3$, about 55 to 85 parts by weight of $K_2HPO_4$, and about 1 to 4 parts by weight of a lubricious filler for enhancing the flowability of the mixture.

* * * * *